US008905387B2

(12) United States Patent
Wang

(10) Patent No.: US 8,905,387 B2
(45) Date of Patent: Dec. 9, 2014

(54) MAGNETIC WORKTABLE

(75) Inventor: Richard Wang, Taichung (TW)

(73) Assignee: Earth-Chain Enterprise Co., Ltd., Taichung (TW)

( * ) Notice: Subject to any disclaimer, the term of this patent is extended or adjusted under 35 U.S.C. 154(b) by 296 days.

(21) Appl. No.: 13/493,075

(22) Filed: Jun. 11, 2012

(65) Prior Publication Data

US 2013/0043630 A1 Feb. 21, 2013

(30) Foreign Application Priority Data

Aug. 19, 2011 (TW) .............................. 100215538 U

(51) Int. Cl.
*B25B 11/00* (2006.01)
*B23Q 3/154* (2006.01)

(52) U.S. Cl.
CPC ............ *B23Q 3/1543* (2013.01); *B25B 11/002* (2013.01)
USPC .................. 269/8; 269/9; 269/55; 269/58

(58) Field of Classification Search
USPC .............................................. 269/8, 9, 55, 58
See application file for complete search history.

(56) References Cited

U.S. PATENT DOCUMENTS

| 3,571,911 | A | * | 3/1971 | Littwin | ........................ 29/558 |
| 4,616,796 | A | * | 10/1986 | Inoue | ...................... 248/206.5 |
| 5,102,288 | A | * | 4/1992 | Kawasaka | .................. 414/676 |
| 7,055,679 | B2 | * | 6/2006 | Shen et al. | ............. 198/867.08 |

FOREIGN PATENT DOCUMENTS

TW M350429 2/2009

* cited by examiner

*Primary Examiner* — Lee D Wilson
*Assistant Examiner* — Shantese McDonald
(74) *Attorney, Agent, or Firm* — Muncy, Geissler, Olds & Lowe, P.C.

(57) ABSTRACT

A magnetic worktable includes a worktable body and a plurality of magnetic devices disposed at a worktable body. Positions of the magnetic devices at the worktable body are variable. The magnetic devices are electrically connected to each other via a circuit, such that the magnetic devices can generate a magnetic attraction force when magnetized. The total area of the magnetic devices accounts for a small portion of the worktable body area, allowing a user to change the arrangement and quantity of the magnetic devices by modularization and according to the shape and processing method of a workpiece. Therefore, any workpieces can be fixed to the magnetic devices by magnetic attraction. Accordingly, the magnetic worktable incurs a low manufacturing cost and advantageously features high practicability.

7 Claims, 10 Drawing Sheets

MAGNETIC WORKTABLE

BACKGROUND OF THE INVENTION

1. Technical Field

The present invention relates to magnetic worktables for use with machine tools, and more particularly, to a magnetic worktable modularized and capable of being flexibly adjusted to operate.

2. Description of Related Art

In general, machine tools, such as lathes, milling machines, grinding machines, and all-in-one processing machines, each comprise a worktable for positioning a workpiece to be processed and mounting a vise or a jig whereby the workpiece is fixed to the worktable.

Not only can a conventional worktable have its workpiece fixed in place under a mechanical force, but a commercially available worktable also can have its workpiece fixed thereto by magnetic attraction under a magnetic force. For example, Taiwan invention Patent M350429 provides a load-carrying platform having therein multiple rows of magnetic assemblies, wherein a current entering the magnetic assemblies is controlled in a manner to generate a magnetic field between two adjacent rows of magnetic assemblies, thereby allowing a workpiece to be attached to the magnetic assemblies. However, the magnetic assemblies have to be present throughout the load-carrying platform, and thus the magnetic worktable incurs a high manufacturing cost.

Another commercially available magnetic worktable comprises a worktable body and a plurality of magnetic devices fixed to the worktable body at appropriate locations thereof, respectively, wherein the magnetic devices admit a current and thereby generate a magnetic attraction force under which a workpiece is fixed to the magnetic devices by magnetic attraction. The magnetic devices have the same structure as the aforesaid ones but have smaller dimensions than the aforesaid ones, thereby allowing the workpiece to be attached to the magnetic devices by a smaller area. Although the magnetic worktable incurs a relatively low manufacturing cost, the magnetic devices are scanty and have invariable positions; as a result, the magnetic devices are only applicable to workpieces of specific shapes and dimensions, thereby compromising the practicability of the magnetic worktable. Furthermore, the magnetic devices have to be electrically connected to rectifiers, respectively, and subjected to current control, respectively; as a result, the circuit and control method of the magnetic worktable are intricate and power-inefficient.

SUMMARY OF THE INVENTION

In view of the aforesaid drawbacks of the prior art, it is an objective of the present invention to provide a magnetic worktable flexibly adjustable to operate according to a workpiece, such that the magnetic worktable incurs a low manufacturing cost and features high practicability.

In order to achieve the above and other objectives, the present invention provides a magnetic worktable comprising a worktable body and a plurality of magnetic devices movably disposed at the worktable body, capable of changing position at the worktable body, electrically connected to each other, and capable of generating a magnetic attraction force when magnetized. The total area of the magnetic devices accounts for a small portion of the worktable body area. A user can change the positions of the magnetic devices according to the shape and dimensions of a workpiece, such that the workpiece can be firmly attached to the magnetic devices by magnetic attraction. Hence, the magnetic worktable incurs a low manufacturing cost and is advantageously characterized by high practicability.

Another objective of the present invention is to provide a circuit for use with the aforesaid magnetic worktable to enable a user to change the quantity and arrangement of the magnetic devices by modularization as needed.

In order to achieve the above and other objectives, the present invention provides a circuit for use with the aforesaid magnetic worktable. The circuit comprises: a plurality of positive wires; a negative wire; and a plurality of permanent magnet electrically controlled coil assemblies. The permanent magnet electrically controlled coil assemblies each comprise a plurality of coils electrically connected in series. The coils are each provided with permanent magnets and magnetizers. The permanent magnet electrically controlled coil assemblies each have an end selectively electrically connected to one of the positive wires and another end electrically connected to the negative wire, such that not only are the permanent magnet electrically controlled coil assemblies flexibly connected to the circuit, but the magnetism of the magnetizers is also put under control as soon as a current enters the positive wires and the negative wire. According to the present invention, each of the magnetic devices need not be directly connected to a power supplying device, nor is it necessary to perform current control on each of the magnetic devices. Therefore, the circuit and control method of the magnetic worktable are flexible and simple.

The structure, features, assembly, and operation of the magnetic worktable of the present invention are illustrated with specific embodiments and described in detail below. However, persons skilled in the art should understand that the specific embodiments are illustrative of the present invention only, but should not be interpreted as restrictive of the scope of the present invention. Hence, all equivalent modifications and replacements made to the specific embodiments should fall within the scope of the present invention.

BRIEF DESCRIPTION OF THE DRAWINGS

Objectives, technical features, and advantages of the present invention are hereunder illustrated with specific embodiments in conjunction with the accompanying drawings, in which.

DETAILED DESCRIPTION OF THE EMBODIMENTS OF THE INVENTION

Figure 1:
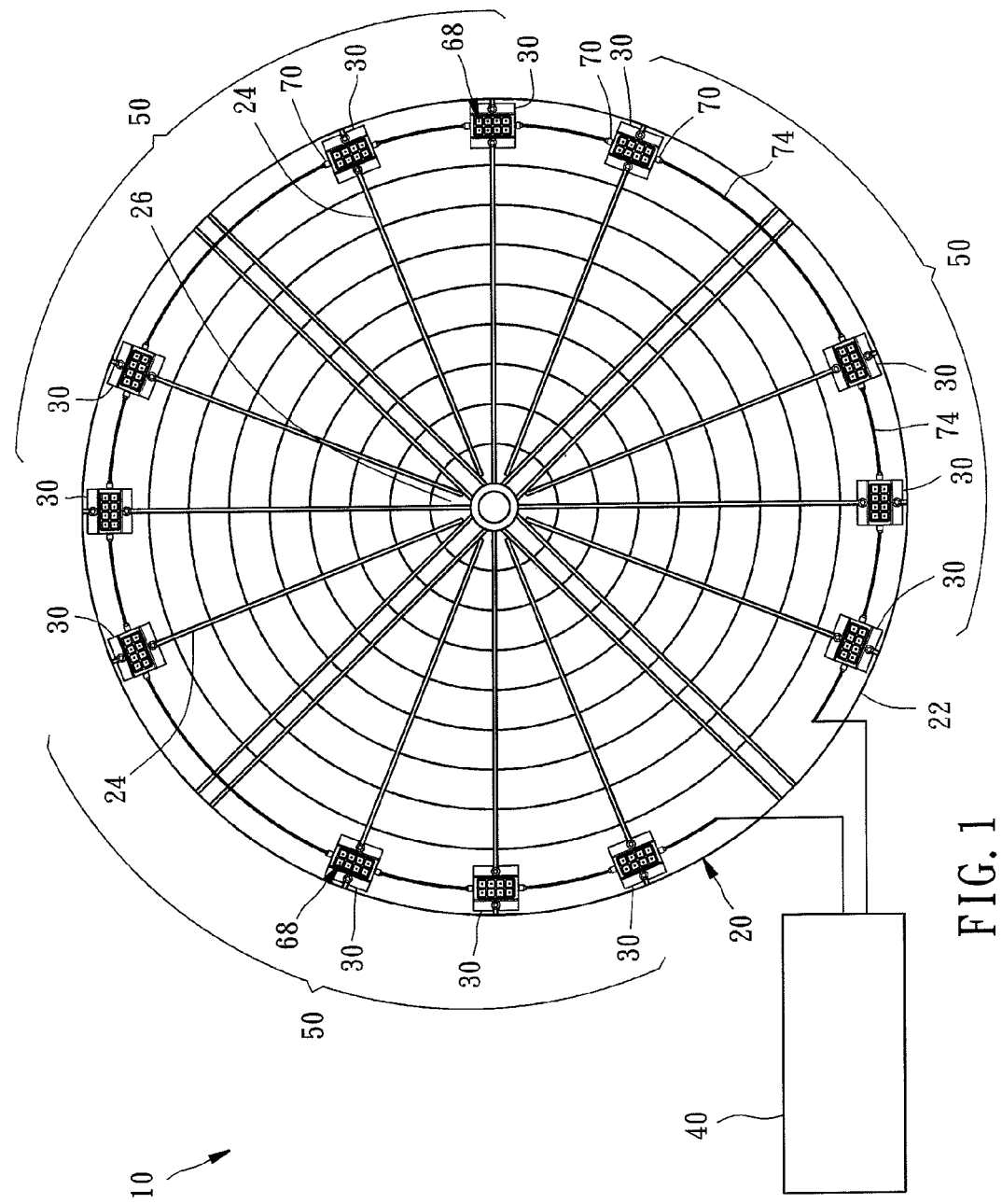
FIG. 1 is a plan view of a magnetic worktable according to a preferred embodiment of the present invention.

Referring to FIG. 1, there is shown a plan view of a magnetic worktable 10 according to a preferred embodiment of the present invention. The magnetic worktable 10 comprises a worktable body 20, a plurality of magnetic devices 30 movably disposed at the worktable body 20 and electrically connected to each other via a circuit 60, and a power supplying device 40 electrically connected to the circuit 60.

The worktable body 20 is disc-like. The worktable body 20 comprises an upper surface 22 and a plurality of grooves 24 each formed concavely on the upper surface 22. The grooves 24 radiate from a central portion 26 of the worktable body 20.

Figure 2:
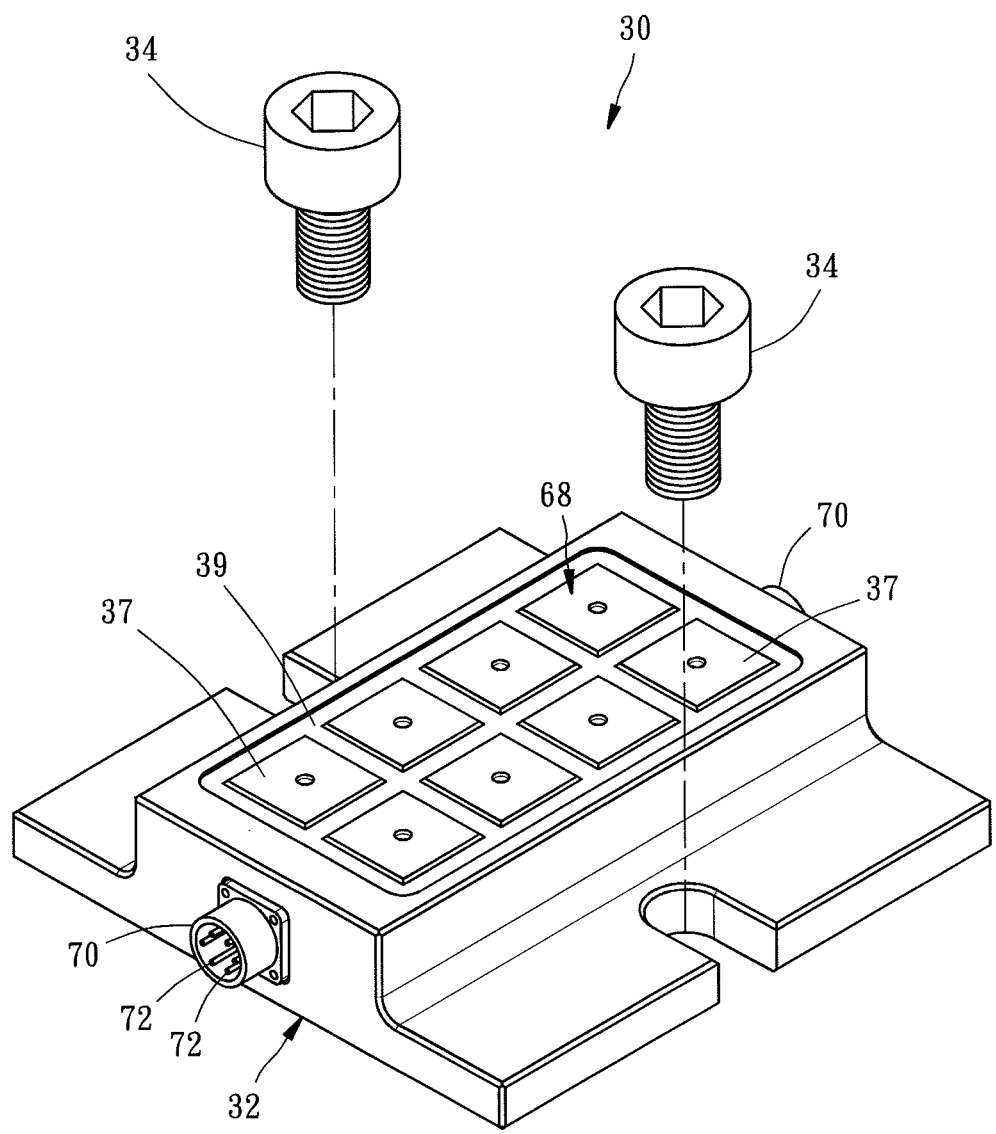
FIG. 2 is a perspective assembled view of a magnetic device of a magnetic worktable according to the preferred embodiment of the present invention.
Figure 3:
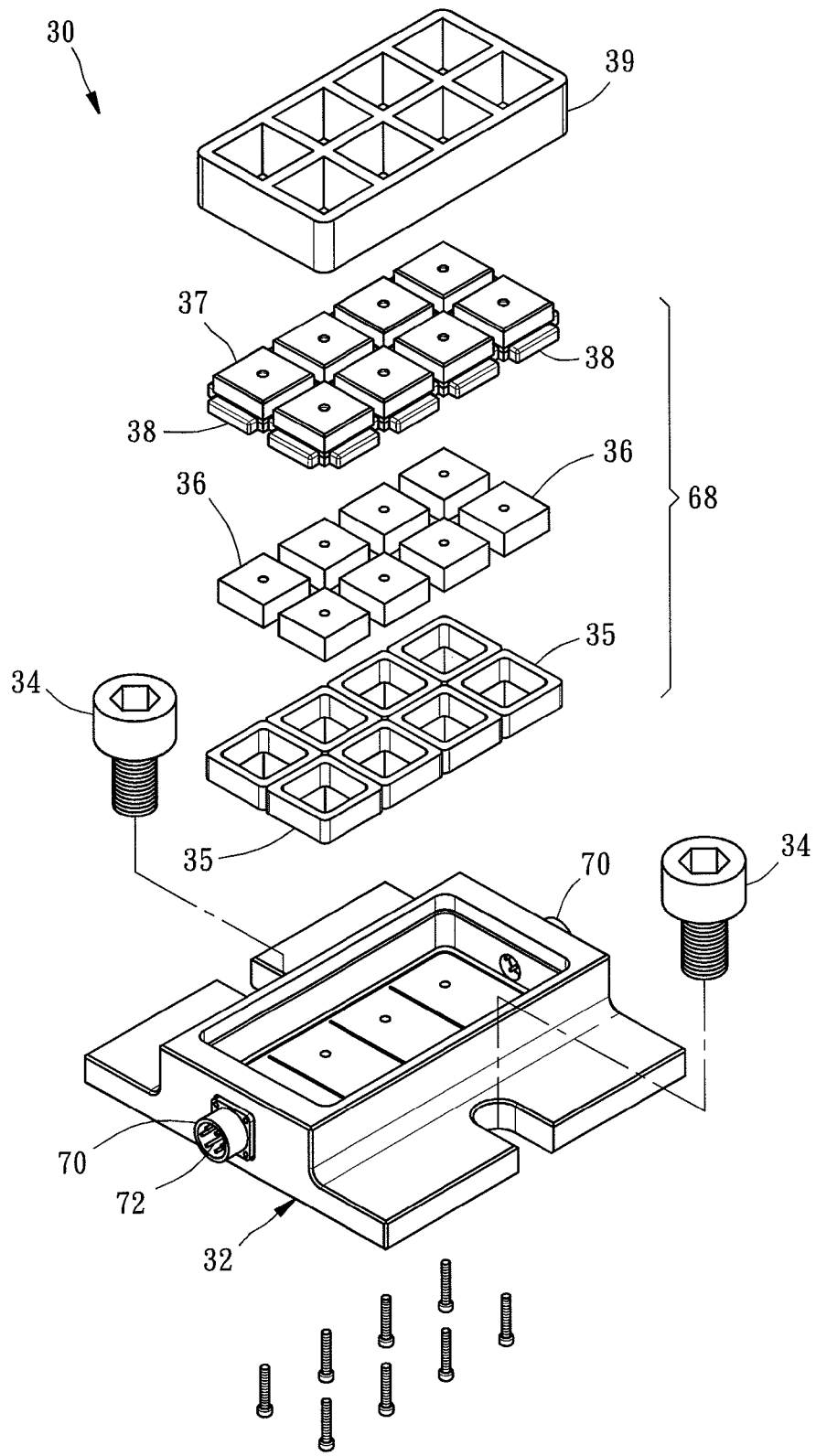
FIG. 3 is a perspective exploded view of magnetic devices of a magnetic worktable according to the preferred embodiment of the present invention.
Figure 4:
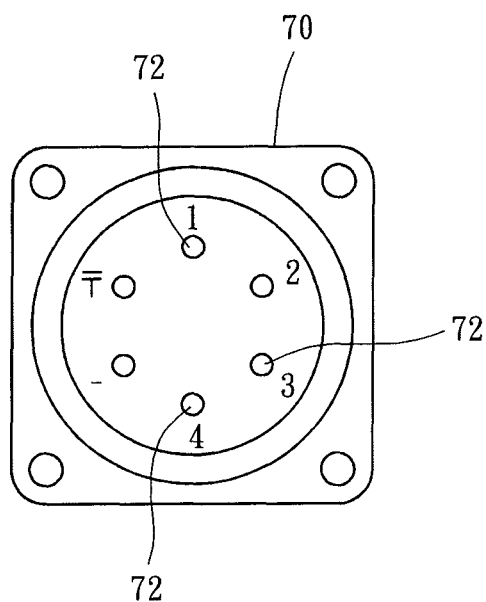
FIG. 4 is a front view of a connector according to the preferred embodiment of the present invention.

Referring to FIG. 2 and FIG. 3, the magnetic devices 30 each comprise a base 32. Two positioning elements 34 are penetratingly disposed on two opposing sides of the base 32, respectively. A permanent magnet electrically controlled coil assembly 68 is disposed inside the base 32. For example, in this embodiment, each permanent magnet electrically controlled coil assembly 68 comprises eight coils 35 electrically connected in series, eight first permanent magnets 36 disposed in the eight coils 35, respectively, eight magnetizers 37 superimposed upon the eight first permanent magnets 36, respectively, and a plurality of second permanent magnets 38 disposed around the magnetizers 37. The gap between the base 32 and the magnetizers 37 and the gap between the magnetizers 37 are filled with an enclosing element 39 formed from a solidified jelly-like material.

The magnetic devices 30 are inserted into the grooves 24, respectively, by means of the positioning elements 34. When the positioning elements 34 are not tightened, each of the magnetic devices 30 can change its position along the grooves 24 such that each of the magnetic devices 30 can change its position at the worktable body 20. Once the positioning elements 34 are tightened, each of the magnetic devices 30 will be fixed to the worktable body 20. Hence, a user can change the positions of the magnetic devices 30 according to the shape and dimensions of a workpiece 76, such that the workpiece 76 can be firmly attached to the magnetic devices 30 by magnetic attraction, and in consequence the magnetic worktable 10 has high practicability. Furthermore, the total area of the magnetic devices 30 accounts for a small portion of the area of the worktable body 20, and therefore the overall manufacturing cost of the magnetic worktable 10 of the present invention is low.

Figure 5:
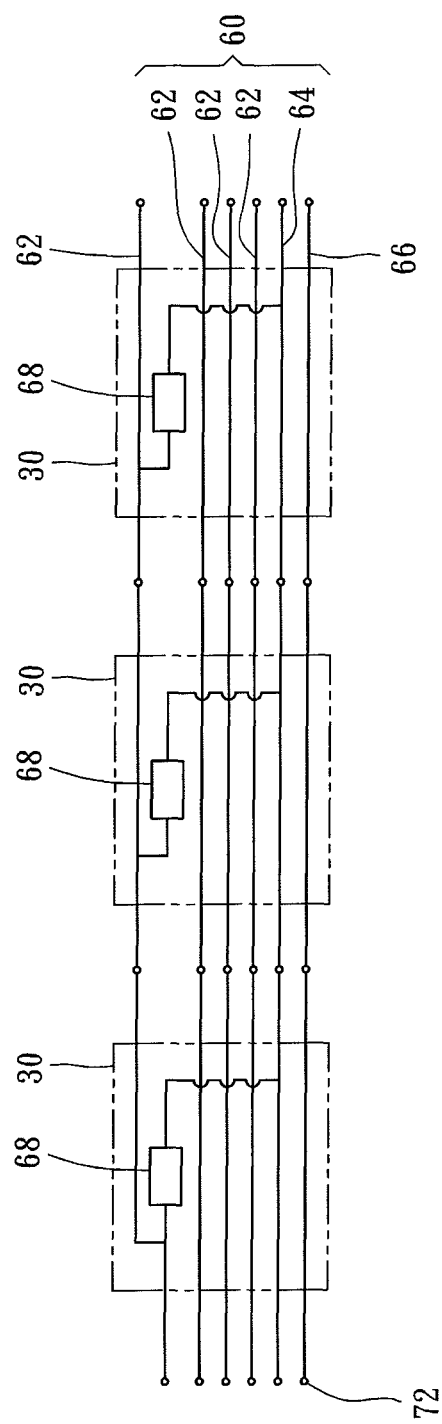
FIG. 5 is a schematic view of a circuit according to the preferred embodiment of the present invention.

Referring to FIG. 1 through FIG. 4, two electrical connectors 70 are disposed on two opposing sides of the base 32 of each of the magnetic devices 30, respectively. The electrical connectors 70 each comprise a plurality of terminals 72. The terminals 72 are electrically connected to each other by a plurality of wires. The magnetic devices 30 are electrically connected to each other by a cable 74 connecting the electrical connectors 70. The cable 74 comprises a plurality of wires therein. Referring to FIG. 5, in the magnetic devices 30, wires connected between the terminals 72 are electrically connected to wires in the cable 74, thereby forming a plurality of positive wires 62, a negative wire 64, and a ground wire 66 which are applicable to the circuit 60 of the present invention. In this embodiment, six said terminals 72 are provided to serve an illustrative purpose. Out of six said terminals 72 are four electrically connected to the positive wires 62, one electrically connected to the negative wire 64, and one electrically connected to the ground wire 66. Selectively, one end of the permanent magnet electrically controlled coil assembly 68 of each of the magnetic devices 30 is in electrical conduction with one of the positive wires 62, whereas the other end of the permanent magnet electrically controlled coil assembly 68 is in electrical conduction with the negative wire 64, such that the magnetic devices 30 are electrically connected in parallel to each other.

The power supplying device 40 is electrically connected to the circuit 60 and adapted to supply a current to the permanent magnet electrically controlled coil assemblies 68. The power supplying device 40 controls the current to the magnetic devices 30 concurrently, thereby enabling the magnetizers 37 to generate a magnetic force.

Figure 6:
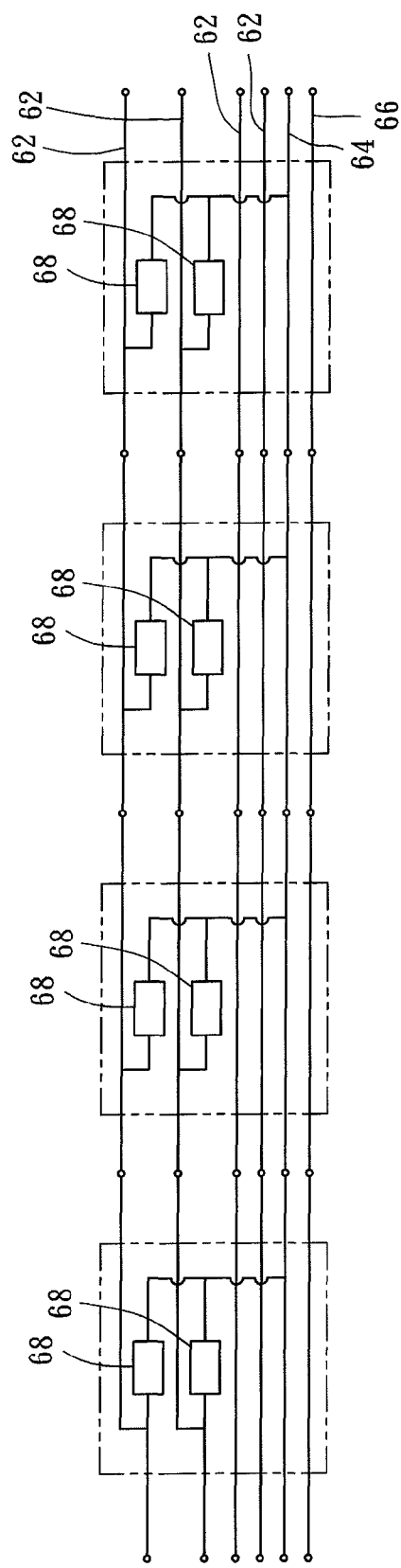
FIG. 6 is a schematic view of another aspect of the circuit according to the preferred embodiment of the present invention.
Figure 7:
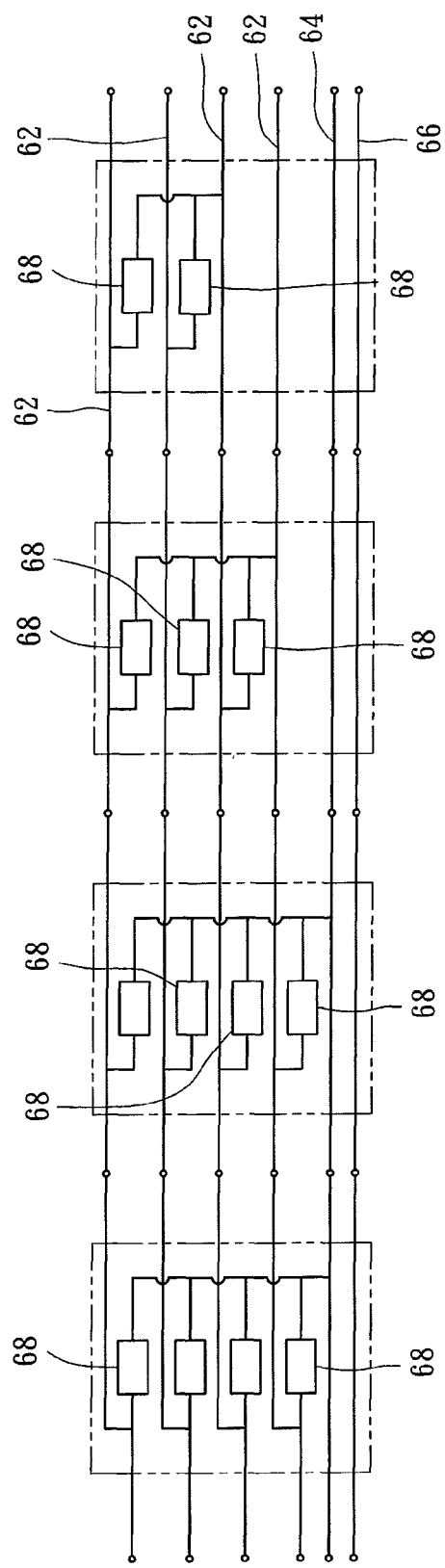
FIG. 7 is a schematic view of yet another aspect of the circuit according to the preferred embodiment of the present invention.
Figure 8:
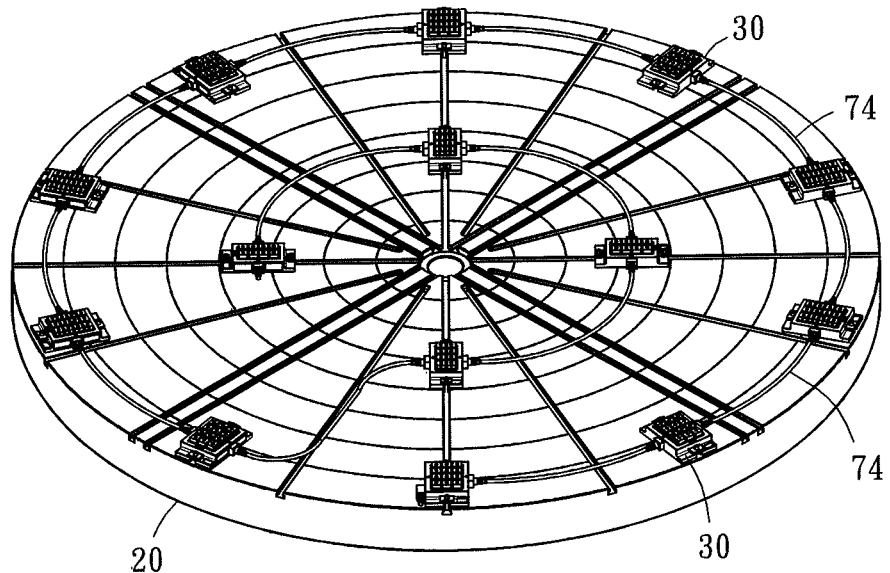
FIG. 8 through FIG. 13 are schematic views of different aspects of embodiment of the present invention.
Figure 9:
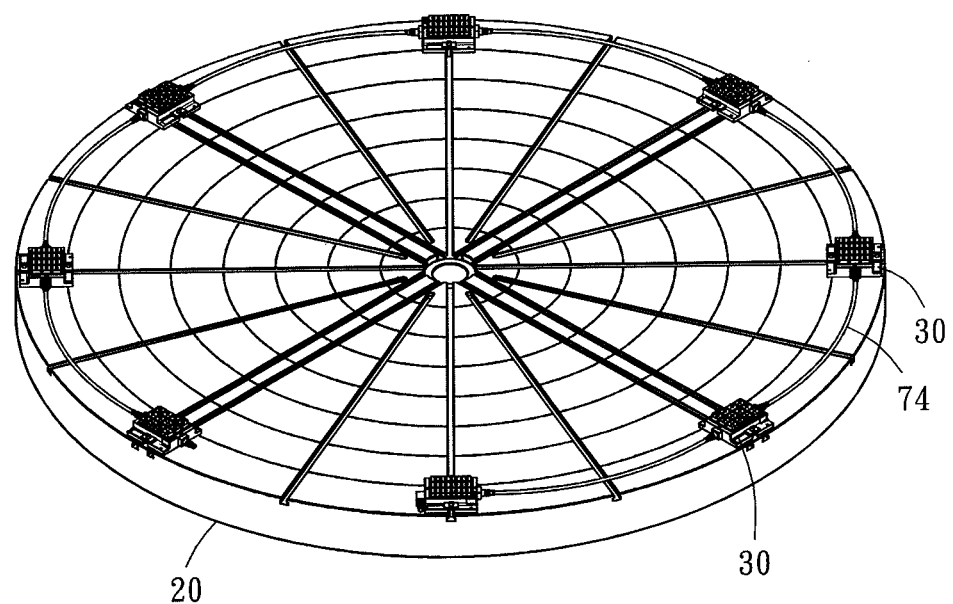
Figure 10:
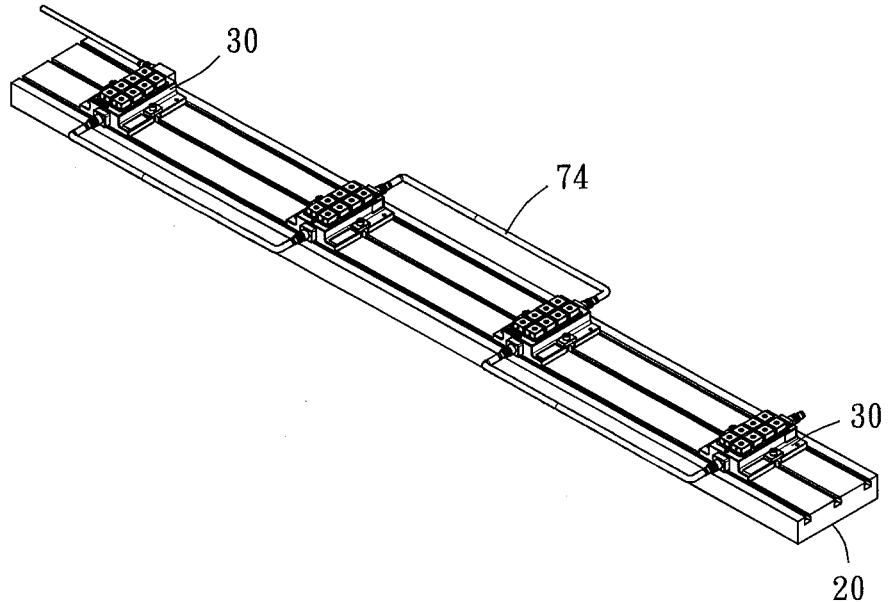
Figure 11:
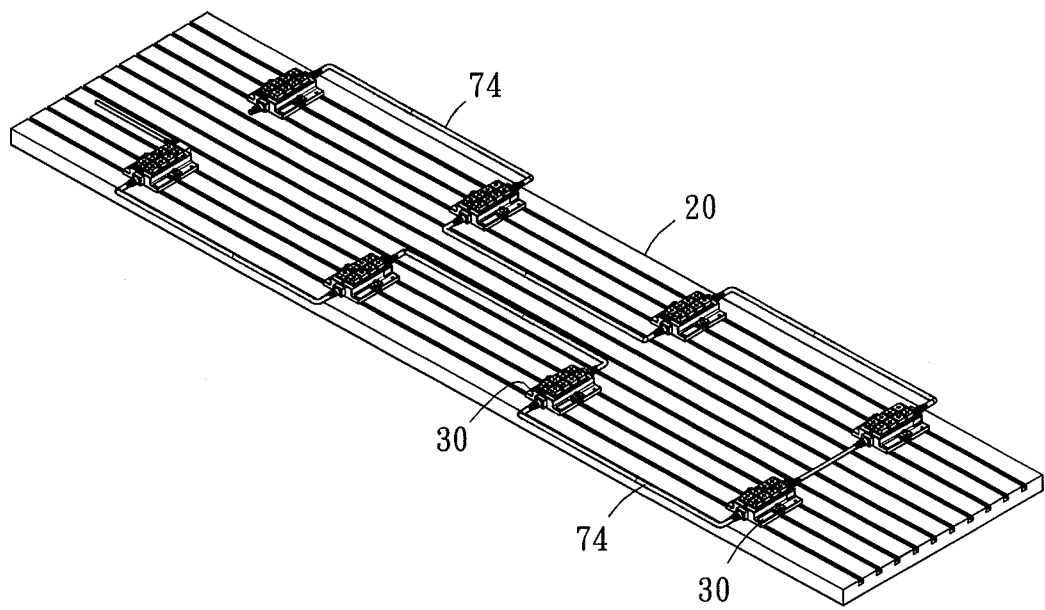
Figure 12:
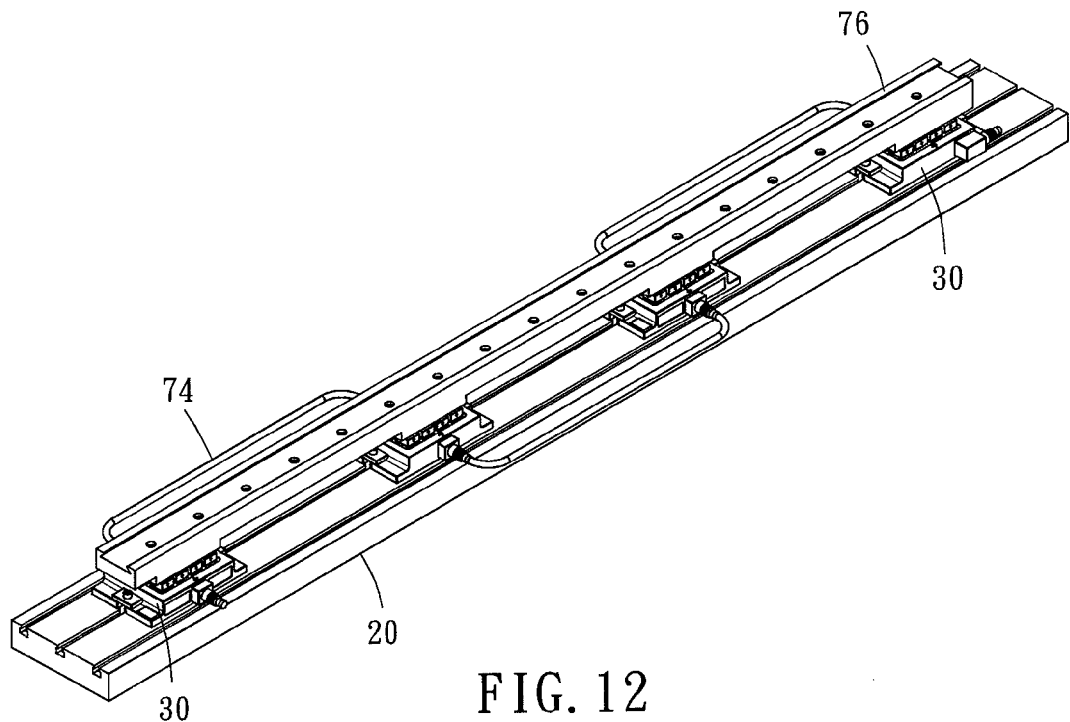
Figure 13:
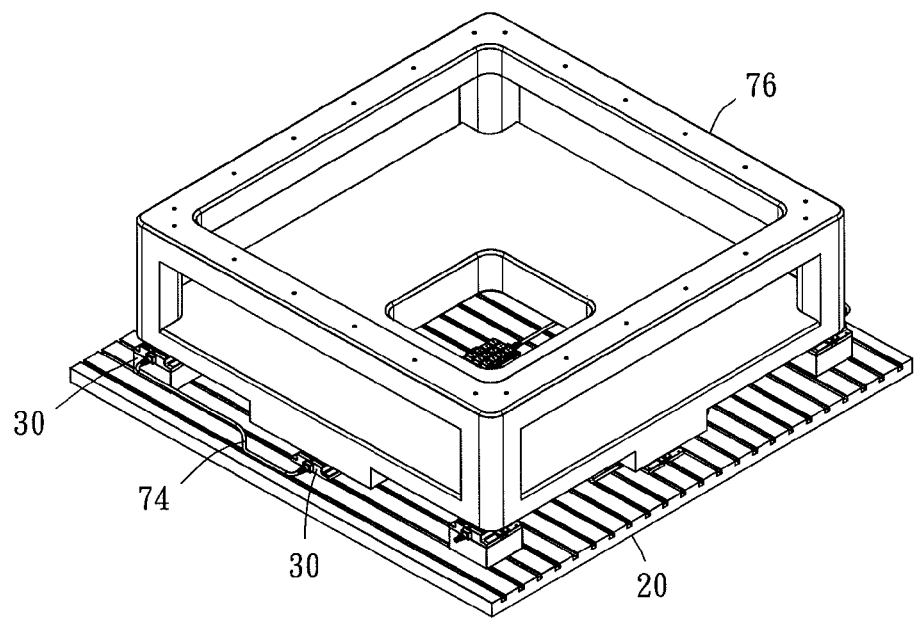

To enable the user to change the quantity and arrangement of the magnetic devices 30 by modularization as needed, it is feasible for the magnetic devices 30 to be modularized and presented in different quantitative combinations. For example, referring to FIG. 1, in this embodiment, three magnetic device assemblies 50 are provided, wherein the magnetic device assemblies 50 each comprise four said magnetic devices 30 disposed at adjacent said grooves 24, respectively. The magnetic devices 30 are electrically connected to same said negative wire 64 and same said ground wire 66 for grounding. Furthermore, the magnetic devices 30 of same said magnetic device assemblies 50 are electrically connected in parallel to each other by same said positive wires 62, whereas the magnetic devices 30 of different said magnetic device assemblies 50 are connected in parallel by being electrically connected to different said positive wires 62. Eventually, the three magnetic device assemblies 50 form a loop together with the power supplying device 40. Referring to FIG. 6 and FIG. 7, same said circuit 60 can be further connected to 8 or 13 said magnetic devices 30; in doing so, each of the magnetic devices 30 need not be directly connected to the power supplying device 40, nor is it necessary to perform current control on each of the magnetic devices 30. Therefore, the circuit and control method of the magnetic worktable 10 are simple.

A point to note is that the magnetic worktable 10 in the above embodiment is mainly applicable to a vertical lathe, and the arrangement of the grooves 24 is designed to allow the magnetic devices 30 to move in the radial direction of the worktable body 20, such that a workpiece 76 of variable dimensions can be fixed in place. Referring to FIG. 8 through FIG. 13, the magnetic worktable 10 of the present invention is also applicable to processing workpieces of different structures and various processing methods. The worktable body 20 is not necessarily disc-like. The grooves 24 do not necessarily have a radiating configuration. Same said groove 24 can accommodate plural said magnetic devices 30, as long as the following steps are performed: selecting the quantity of the magnetic devices 30 beforehand according to the structural feature of a workpiece 76 to be processed; putting the magnetic devices 30 at the worktable body 20; changing the positions of the magnetic devices 30 at the worktable body 20 according to the shape of the workpiece 76; electrically connecting the magnetic devices 30 in a manner that the magnetic devices 30 are electrically connected in parallel to each other and form a current loop together with the power supplying device 40; positioning the workpiece 76 at the magnetic devices 30; and magnetizing the permanent magnet electrically controlled coil assemblies 68 of the magnetic devices 30 by means of the power supplying device 40 so as for the magnetic devices 30 to generate a magnetic attraction force under which the workpiece 76 can be fixed to the worktable body 20.

In conclusion, the advantages of the present invention are as follows:

1. The magnetic worktable of the present invention is particularly applicable to permanent magnet electrically controlled coils. Due to the intrinsic magnetic force strength and induction characteristics of the permanent magnets, the magnetic worktable of the present invention can accomplish magnetization instantaneously, produce a sufficient magnetic force for fixing a workpiece in place in the absence of continuous power supply, consume relatively little power, and feature excellent magnetic attraction. Hence, the magnetic worktable of the present invention is energy-efficient, environmentally friendly, and energy-saving.

2. The present invention provides the same circuit framework whereby a user can change the quantity of magnetic devices independently, selectively, and expandably as needed, without purchasing unnecessary equipment, thereby saving costs and cutting costs.

3. Given the modularization of the magnetic devices, it is feasible to adjust the quantity, positions, and distance of the magnetic devices flexibly according to the shape or processing method of various workpieces, such that the magnetic worktable of the present invention can fix the workpieces in place in a flexible and adaptive manner.

The present invention is disclosed above by preferred embodiments. However, persons skilled in the art should understand that the preferred embodiments are illustrative of the present invention only, but should not be interpreted as restrictive of the scope of the present invention. Hence, all equivalent replacements or changes made to the aforesaid embodiments should fall within the scope of the present invention.

What is claimed is:

1. A magnetic worktable, comprising:
a worktable body; and
a plurality of magnetic devices movably disposed at the worktable body, capable of changing position at the worktable body, electrically connected to each other via a circuit, and capable of generating a magnetic attraction force when magnetized,
wherein two electrical connectors are disposed on each of the magnetic devices respectively, the electrical connectors each comprise a plurality of terminals, the terminals are electrically connected to each other by a plurality of wires, the magnetic devices are electrically connected to each other by a cable connecting the electrical connectors, the cable comprises a plurality of wires therein, the wires connected between the terminals are electrically connected to wires in the cable, thereby forming a plurality of positive wires, a negative wire, and a ground wire which are applicable to the circuit.

2. The magnetic worktable of claim 1, wherein the worktable body comprises at least a groove, and the magnetic devices change position along the at least a groove of the worktable body.

3. The magnetic worktable of claim 2, wherein the worktable body comprises a central portion and a plurality of grooves radiating from the central portion, and the magnetic devices are disposed at the grooves, respectively.

4. The magnetic worktable of claim 2, wherein the magnetic devices each comprise a base and at least a positioning element penetratingly disposed at the base and movably disposed at the at least a groove of the worktable body.

5. The magnetic worktable of claim 1, further comprising at least a magnetic device assembly, the at least a magnetic device assembly comprising a plurality of magnetic devices electrically connected in parallel to each other, the magnetic devices each comprising a permanent magnet electrically controlled coil assembly, the permanent magnet electrically controlled coil assemblies each comprising a plurality of coils electrically connected in series, the coils each being provided with permanent magnets and magnetizers.

6. A circuit for use with the magnetic worktable of claim 1, the circuit comprising:
a plurality of positive wires;
a negative wire; and
a plurality of permanent magnet electrically controlled coil assemblies, the permanent magnet electrically controlled coil assemblies each comprising a plurality of coils electrically connected in series, the coils each being provided with permanent magnets and magnetizers, the permanent magnet electrically controlled coil assemblies each having an end selectively electrically connected to one of the positive wires and another end electrically connected to the negative wire, such that magnetism of the magnetizers is put under control as soon as a current enters the positive wires and the negative wire.

7. The circuit of claim 6, wherein the positive wires and the negative wire consist of wires disposed inside the magnetic devices and cables electrically connected between the magnetic devices.

* * * * *